(12) United States Patent
Rader

(10) Patent No.: US 11,451,865 B1
(45) Date of Patent: Sep. 20, 2022

(54) RELAY OF AUDIO AND/OR VIDEO STEGANOGRAPHY TO IMPROVE SECOND SCREEN EXPERIENCES

(71) Applicant: CUE Audio, LLC, Albany, TX (US)

(72) Inventor: Jameson Rader, Las Vegas, NV (US)

(73) Assignee: Cue Audio, LLC, Albany, TX (US)

(*) Notice: Subject to any disclaimer, the term of this patent is extended or adjusted under 35 U.S.C. 154(b) by 6 days.

(21) Appl. No.: 16/525,266

(22) Filed: Jul. 29, 2019

Related U.S. Application Data

(60) Provisional application No. 62/832,631, filed on Apr. 11, 2019.

(51) Int. Cl.
| | |
|---|---|
| *H04N 21/4408* | (2011.01) |
| *H04N 21/44* | (2011.01) |
| *G06F 3/16* | (2006.01) |
| *H04N 21/81* | (2011.01) |
| *H04N 21/4363* | (2011.01) |
| *H04N 21/41* | (2011.01) |

(52) U.S. Cl.
CPC ....... *H04N 21/44008* (2013.01); *G06F 3/165* (2013.01); *H04N 21/4126* (2013.01); *H04N 21/43637* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 10,169,985 B1 | 1/2019 | Rader | |
| 2006/0259942 A1 | 11/2006 | Toyama et al. | |
| 2009/0150553 A1* | 6/2009 | Collart | G11B 27/105 |
| | | | 709/229 |
| 2011/0115977 A1 | 5/2011 | Simpson et al. | |
| 2011/0247044 A1* | 10/2011 | Jacoby | H04H 60/43 |
| | | | 725/115 |
| 2012/0304240 A1 | 11/2012 | Pereira et al. | |
| 2014/0280695 A1* | 9/2014 | Sharma | H04N 21/242 |
| | | | 709/217 |
| 2015/0082336 A1* | 3/2015 | Moon | H04N 21/64322 |
| | | | 725/30 |
| 2015/0172780 A1 | 6/2015 | Soundararajan et al. | |
| 2015/0373060 A1 | 12/2015 | Shmilov et al. | |
| 2018/0109999 A1* | 4/2018 | Finnegan | H04W 52/02 |

OTHER PUBLICATIONS

International Search Report and Written Opinion dated Dec. 4, 2019 for PCT/US2019/052197.

* cited by examiner

*Primary Examiner* — Jason K Lin
(74) *Attorney, Agent, or Firm* — Suiter Swantz pc llo

(57) ABSTRACT

A system for providing a second screen experience to an end user is disclosed. The system may include a first media device including one or more processors configured to receive a broadcast signal encoded with steganographic metadata, extract a payload from the steganographic metadata, and transmit a steganographic metadata signal, the steganographic metadata signal including the extracted payload. The system may further include a second media device including one or more processors configured to receive the steganographic metadata signal from the first media device, determine one or more data identifiers within the received steganographic metadata signal, and execute one or more actions based on the one or more data identifiers.

11 Claims, 6 Drawing Sheets

RELAY OF AUDIO AND/OR VIDEO STEGANOGRAPHY TO IMPROVE SECOND SCREEN EXPERIENCES

CROSS-REFERENCE TO RELATED APPLICATION

The present application claims the benefit under 35 U.S.C. § 119(e) of U.S. Provisional Application Ser. No. 62/832,631, filed Apr. 11, 2019, entitled RELAY OF AUDIO AND/OR VIDEO STEGANOGRAPHY TO IMPROVE SECOND SCREEN EXPERIENCES, naming Jameson Rader as inventor, which is incorporated herein by reference in the entirety.

TECHNICAL FIELD

The present disclosure generally relates to audio/visual signal processing, and, more particularly, to receiving audio and/or visual data steganographically embedded and/or generated ad hoc within media on a first media device and relaying the extracted data for action on a second media device.

BACKGROUND

The ability to enrich content within an audio and/or video broadcast is important for the entertainment, advertising, and information industries. One method for enriching content is to provide supplemental data/information which may be transmitted to a second user device of an end user. This ability of a second media device (e.g., smartphone, mobile device, tablet) to be used in coordination and tandem with a first media device (e.g., television, radio) transmitting primary audio/video content is referred to as a "second screen experience." The "second screen experience" has been a long-desired feature in both the broadcasting industry and live event industry. For example, a program being viewed on a first user device, such as a television, may be supplemented by data/information provided to a second user device, such as a smartphone or tablet.

One previous approach which has been used to implement a second screen experience is known as data-over-audio. With data-over-audio, data snippets (e.g., "audible watermarks") are packaged into audio signals, which may then be recognized and executed by the second media device. However, with traditional data-over-audio techniques, the second media device (e.g., smartphone) must be in a constant listening state in order to identify data embedded within the audio signals. This causes privacy concerns for the end user, as the second media device may record/overhear conversations of the end user. Additionally, electronic companies are in the practice of declaring to the end-user when an application is "listening in the background," which may intimidate many end users and limit the widespread implementation of second screen experiences. Furthermore, many previous data-over-audio techniques have required an application including a microphone input operating in the foreground of the second media device (e.g., smartphone) to implement the second screen experience. For example, if a user watching television at home wished to participate in a "second screen experience" he or she would need to either (1) have the app open in the foreground of their smartphone throughout the entire duration of the televised program, or (2) allow the app to process and decode audio in the background, which may infringe on the user's privacy.

Both data-over-audio technology also requires the second media device be within "earshot," or hearing range, of the first media device (e.g., television, radio). It is noted that while sound may transverse a corner, echoes and reflections cause signal degradation, often causing line-of-sight issues for current systems implementing second screen experiences. Finally, both data-over-audio technologies are limited to recovering data from the audio channel, which may hamper the effectiveness, throughput, and scalability of second screen experience systems. Therefore, it would be desirable to provide a system and method that cure one or more of the shortfalls of the previous approaches identified above.

SUMMARY

A system for providing a second screen experience to an end user is disclosed. The system may include a first media device including one or more processors configured to receive a broadcast signal encoded with steganographic metadata, extract a payload from the steganographic metadata, and transmit a steganographic metadata signal, the steganographic metadata signal including the extracted payload. The system may further include a second media device including one or more processors configured to receive the steganographic metadata signal from the first media device, determine one or more data identifiers within the received payload of the steganographic metadata signal, and execute one or more actions based on the one or more data identifiers.

A system for providing a second screen experience to an end user is disclosed. The system may include a first media device including one or more processors configured to receive a broadcast signal encoded with steganographic metadata, extract a payload from the steganographic metadata, and transmit a steganographic metadata signal to a second media device, the steganographic metadata signal including the extracted payload. In embodiments, the second media device may be configured to execute one or more actions based on the steganographic metadata signal.

A system for providing a second screen experience to an end user is disclosed. The system may include a first media device configured to receive a broadcast signal encoded with steganographic metadata and generate a primary audio/visual signal in response to the received broadcast signal. The system may also include a converter device including one or more processors configured to receive the broadcast signal encoded with the steganographic metadata from the first media device, extract a payload from the steganographic metadata, and transmit a steganographic metadata signal, the steganographic metadata signal including the extracted payload. The system may further include a second media device including one or more processors configured to receive the steganographic metadata signal from the converter device, determine one or more data identifiers within the received steganographic metadata signal, and execute one or more actions based on the one or more data identifiers.

A system for providing a second screen experience to an end user is disclosed. The system may include a first media device including one or more processors configured to receive a broadcast signal, identify one or more content identifier (ID) markers within the broadcast signal, identify supplementary content associated with the one or more content ID markers within a supplementary content database, and transmit a steganographic metadata signal, the steganographic metadata signal encoded with the identified supplementary content. The system may further include a second media device including one or more processors configured to receive the steganographic metadata signal from the first media device, and execute one or more actions based on the encoded supplementary content.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DESCRIPTION OF THE INVENTION

Figure 1A:
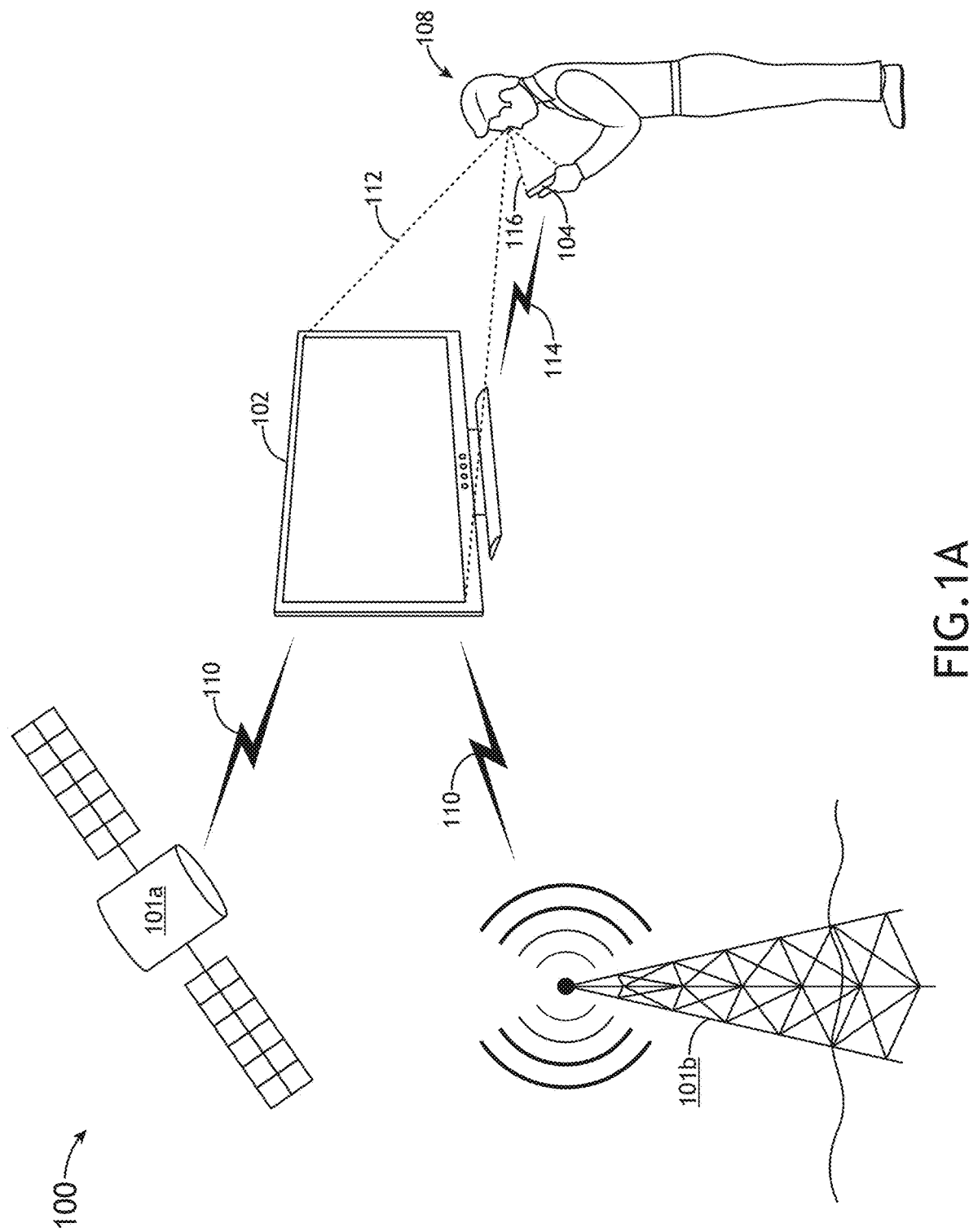
FIG. 1A illustrates a simplified block diagram of a system for providing second screen experiences, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the present disclosure.

Reference will now be made in detail to the subject matter disclosed, which is illustrated in the accompanying drawings.

Referring generally to FIGS. 1A-4, a system and method for processing steganographic metadata to provide second screen experiences is disclosed, in accordance with one or more embodiments of the present disclosure. Embodiments of the present disclosure are directed to a system and method for receiving a broadcast signal embedded with steganographic metadata with a first media device, and transmitting the steganographic metadata to a second media device in order to enhance second screen experiences.

Embedding data and information (e.g., steganographic metadata) within audio and/or video channels of a broadcast signal is a method to enrich the viewer's experience by adding information relevant to the broadcast or program. This supplemental information may then be shown/played via a second media device (e.g., smartphone, tablet), thereby enabling a second screen experience. Steganographic metadata added to a broadcast signal may provide added value to the primary content of the broadcast signal. For example, steganographic metadata may provide informative text-based directions to a website detailing in-depth coverage of an event in a currently viewed news broadcast. By way of another example, steganographic metadata may increase the entertainment value of a television program by including text-based directions to download episodes of a currently viewed television program or show biographical information of an individual currently displayed on screen. By way of another example, steganographic metadata may increase advertising value of a television program by providing data associated with a coupon to a product currently viewed in a commercial or other advertisement.

One currently used method for providing a second screen experience includes data-over-audio techniques, which embed/encode steganographic metadata within the audio signal. With data-over-audio techniques, after a broadcast has been received and played through a first media device, a second media device can listen to the audio, where it may identify the steganographic metadata code within the audio sound, and perform a function based on the metadata within the audio signals. However, current data-over-audio technologies have considerable limitations. For example, current data-over-audio technologies require the second media device to be in a constant listening state, which poses privacy concerns for end users.

Accordingly, embodiments of the present disclosure are directed to a system and method utilizing audio steganography to transmit a broadcast signal encoded with metadata to a first media device, and transmit extracted metadata (e.g., an extracted payload of the metadata) to a second media device. Some embodiments of the present disclosure are directed to encoding steganographic metadata into broadcast signals using ultrasound or near-ultrasound frequencies, and transmitting the metadata from a first user device to a second user device via WiFi or Bluetooth in order to enable a second screen experience.

Additional embodiments of the present disclosure relate to the enhancement of an audio/visual experience, such as, but not limited to, a television broadcast, streamed content (e.g., Netflix, Hulu, and the like), or an advertisement from a kiosk screen embedded with steganographic metadata. Further embodiments of the present disclosure are directed to a system capable of relaying steganographic metadata from a first media device (e.g., television, radio) to a second media device (e.g., smartphone, tablet, smart watch) utilizing traditional transmission protocols (e.g., Wi-Fi, Wi-Fi direct, TCP/IP, Bluetooth®, Bluetooth Low Energy, and the like). The data transmitted may be decoded from the first media device's audio layer using audio steganographic decoding techniques, or within a video layer using visual steganographic decoding techniques. For example, embodiments of the present disclosure may serve to selectively activate and/or control vibration, display, sound or other functions of a second media device (e.g., mobile communications device) at specified moments. For instance, a steganographic metadata encoding in a broadcast signal subsequently converted to a Bluetooth or Bluetooth low energy signal may allow a user's device (e.g., smartphone) to notify the user when a signal was present in a program and avoid the need of microphone access (for audio steganography), camera access (for visual steganography), or an application constantly running in the foreground of the user's device. Converting data-over-audio signals to a data signal, via Bluetooth for example, also helps alleviate the line-of-sight issue and eliminate latency of detection.

FIG. 1A illustrates a simplified block diagram of a system 100 for providing second screen experiences, in accordance with one or more embodiments of the present disclosure. More specifically FIG. 1A illustrates a simplified block diagram of a system 100 for processing a broadcast signal 110 embedded/encoded with steganographic metadata.

In one embodiment, the system 100 includes one or more first media devices 102 configured to receive broadcast signals 110 from one or more broadcast signal sources 101a, 101b. It is noted herein that a broadcast signal 110 may include any signal communicatively received by an electronic device. For example, a broadcast signal 110 may include, but is not limited to, a radio signal, a Bluetooth signal, a Bluetooth Low Energy (BLE) signal, a Wi-Fi signal, a Wi-Fi direct signal, a TCP/IP signal, a mobile phone signal, an Audio/Visual data signal contained within a media file (e.g., MP4, AVI), or an Audio/Visual data signal streamed from a streaming service (e.g., Netflix, Hulu, and the like). In this regard, the one or more broadcast signal sources 101a, 101b may include any transmitting device configured to transmit signals including, but not limited to, antennas, terrestrial towers, satellites, and the like. Similarly, the one or more first media devices 102 may include any electronic device configured to receive broadcast signals 110 and transmit audio/visual (NV) signals 112 to an end user 108. For example, the first media device 102 may include, but is not limited to, a television, radio, tablet, advertising kiosk, jumbotron, and the like.

In one embodiment, the broadcast signal 110 may be embedded/encoded with steganographic metadata, which may be received by the first media device 102. For example, the broadcast signal 110 may be embedded with steganographic metadata in ultrasound or near-ultrasound frequencies. As it is used herein, the term "steganographic metadata" may be used to refer to metadata embedded and/or encoded within a broadcast signal 110 which may be received by the first media device 102, and transmitted from the first media device 102 to a second media device 104 in order to provide a second screen experience to the end user 108. It is contemplated herein that supplemental data provided to the end user 108 via the second user device 104 may enhance the end user 108 experience and engagement with the primary content of the broadcast signal 110.

An example may prove to be illustrative. In this example, suppose an individual (e.g. end user 108) is watching an informative video broadcast via a first media device 102. The first media device 102 may include a television at home, a television at a cinema, or an electronic advertising billboard/kiosk at a bus stop. In this example, one or more broadcast signal sources 101a, 101b are configured to transmit broadcast signals 110 to the first media device 102. The broadcast signals 110 may include information regarding the primary content (e.g., informative video broadcast), as well as embedded steganographic metadata associated with supplemental content associated with the informative video broadcast. In this regard, the steganographic metadata may be embedded within the audio channel of the source video of the broadcast signal 110.

Continuing with the same example, the first media device 102 (e.g., television, electronic advertising billboard, and the like) may receive the broadcast signal 110 and transmit a primary A/V signal 112 which may be perceived (e.g., seen, heard) by the end user 108. The primary A/V signal 112 makes up the informative video broadcast, and may include sights and sounds emanating from the first media device 102 (e.g., television). Upon receiving the broadcast signal 110, the first media device 102 may be further configured to detect and extract a payload from the metadata embedded within the broadcast signal 110. The first media device 102 may then transmit a steganographic metadata signal 114, via Bluetooth signals, to a second media device 102 (e.g., smartphone, laptop, tablet, smart watch, and the like). The second media device 102 may then be configured to receive the steganographic media signal 114 via Bluetooth, which causes the second media device 104 to perform one or more actions in response to the received steganographic media signal 114. In this regard, the steganographic media signal 114 may cause the second media device 104 to generate a supplementary A/V signal 116 which may be perceived (e.g., seen, heard) by the end user 108. In additional and/or alternative embodiments, the metadata may also be transmitted in the video channel or stored in a database and arrived at by means of ACR.

For instance, the steganographic media signal 114 may cause the second media device 104 (e.g., smartphone) to display a push notification, display data associated with the informative video broadcast, display an advertisement associated with the informative video broadcast, provide an executable/selectable link (URL) which the end user 108 may follow to retrieve additional information associated with the informative video broadcast, and the like. For instance, the steganographic media signal 114 may cause the second user device 104 to display a URL for a website associated with the informative video broadcast, which may be viewed on the second media device 104 via supplementary A/V signal 116. The end user 108 may then subsequently inspect the URL at their leisure, which may avoid the need for the end user 108 to memorize, jot down, or snap a picture of the informative video broadcast if they desire to retrieve supplemental information at a later time. In this regard, the steganographic media signal 114 may deliver a "local notification" as if the nearby first media device 102 (e.g., television, electronic advertising billboard) were a Bluetooth beacon.

It is noted herein that Bluetooth beacons typically emit a constant signature. However, in the context of system 100 illustrated in FIG. 1A, the nearby first media device 102 (e.g., television, electronic advertising billboard) may convert embedded data within the broadcast signal 110 to dynamically change its signature according to the displayed content (e.g., the informative video broadcast within primary A/V signal 112). As compared to previous data-over-audio techniques, which require a second media device 104 to be in a constant listening state with microphones, system 100 of the present disclosure is configured to transmit extracted steganographic metadata using widespread data transmission techniques (e.g., Bluetooth). Accordingly, embodiments of the present disclosure may eliminate the need for constant listening states and may streamline data extraction in order to enable efficient, widespread implementation of second screen experiences.

Figure 1B:
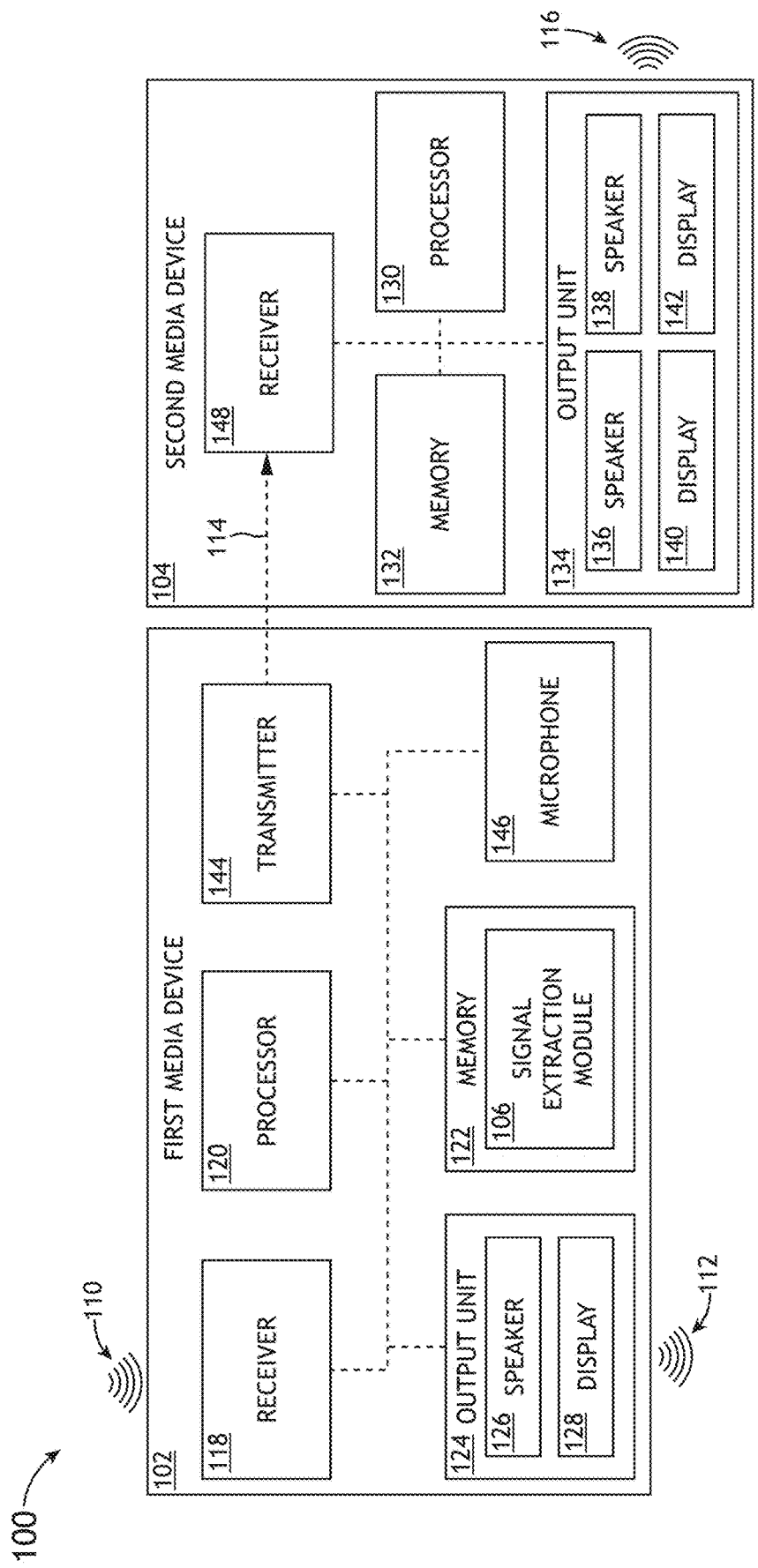
FIG. 1B illustrates a simplified block diagram of a system for providing second screen experiences, in accordance with one or more embodiments of the present disclosure.

FIG. 1B illustrates a simplified block diagram of a system 100 for providing second screen experiences, in accordance with one or more embodiments of the present disclosure. More specifically, FIG. 1B illustrates a simplified block diagram of a system 100 for transmitting steganographic metadata from a first media device 102 to a second media device 104 to enable a second screen experience. It is noted herein that any discussion associated with system 100 illustrated in FIG. 1A may be regarded as applying to system 100 illustrated in FIG. 1B, unless noted otherwise herein. Similarly, it is noted herein that any discussion associated with system 100 illustrated in FIG. 1B may be regarded as applying to system 100 illustrated in FIG. 1A, unless noted otherwise herein.

In one embodiment, the first media device 102 may include, but is not limited to, a receiver 118, one or more processors 120, a memory 122 including a signal extraction module 106, an output unit 124, a transmitter 144, and one or more microphones 146.

In one embodiment, the receiver 118 of the first media device 102 is configured to receive a broadcast signal 110 transmitted by a broadcast signal source 101. It is noted herein that the receiver 118 may be configured to receive any signal known in the art including, but not limited to, sound wave signals, an A/V signals, radio frequency (RF) signals, digital signals (e.g., data packets), Wi-Fi signals, Wi-Fi direct signals, TCP/IP signals, Bluetooth signals, Bluetooth low energy signals, and the like. The broadcast signal 110 may include data associated with a primary A/V signal 112, as well as embedded steganographic metadata. It is noted herein that steganographic metadata may be embedded within the broadcast signal 110 in any manner known in the art. For example, the one or more broadcast signal sources 101a, 101b (shown in FIG. 1A) may be configured to embed the steganographic metadata within the broadcast signals 110. In this example, the steganographic metadata may be embedded within the broadcast signal 110 by the entities responsible for the broadcast signal 110. By way of another example, the incorporation of steganographic metadata into the broadcast signal 110 may be performed by a third party.

In this regard, the first media device 102 may be configured to receive the broadcast signal 110, via the receiver 118, and transmit one or more primary A/V signals 112 via an output unit 124 which may be perceived by an end user 108. For instance, the first media device 102 may include a television, and the broadcast signals 110 may include signals for a broadcast television program. In this example, the television (e.g., first media device 102) may be configured to receive the broadcast signals 110 and transmit primary A/V signals 112 to the end user 108 in response to the broadcast signals 110 via one or more speakers 126 and/or one or more displays 128. Accordingly, the end user 108 may be able to see and hear the broadcast television program via the primary A/V signals 112 transmitted by the first media device 102 (television).

As will be described in further detail herein, it is noted that the first media device 102 may transmit a primary A/V signal 112 to the end user 108/second media device 104 which contains the steganographic metadata signal 114, or may transmit a primary A/V signal 112 from which a payload of the steganographic metadata signal 114 has been extracted.

In another embodiment, as noted previously herein, the broadcast signal 110 may include embedded steganographic metadata which includes supplemental data/information which may be associated with the primary content of the broadcast signal 110. In particular, steganographic metadata may be embedded within the broadcast signal 110 at selected times (e.g., timecodes) such that the encoded steganographic metadata is configured to cause the second media device 104 to execute particular actions at the selected times within the broadcast signal 110.

It is noted herein that steganographic metadata may be encoded within the broadcast signal using any techniques known in the art. For example, steganographic metadata may be encoded within the broadcast signal 110 via visual steganography (e.g., encoding metadata within frames of video signals). For example, steganographic metadata may be encoded within the broadcast signal 110 via audio steganography (e.g., encoding metadata within audio signals). Examples of encoding metadata within A/V signals may be further understood with reference to U.S. Pat. No. 10,169,985 B1, filed on Nov. 25, 2016, naming Jameson Rader as inventor, which is incorporated herein by reference in the entirety.

For example, a broadcast signal 110 may include steganographic metadata which is encoded within the broadcast signal 110 using ultrasonic frequencies. Due to the fact that most end users 108 are unable to perceive ultrasonic frequencies, the encoded steganographic metadata may be left within the broadcast signal 110 such that the transmitted primary AV signals 112 include the embedded metadata. In additional and/or alternative embodiments, the one or more processors 120 may be configured to filter, or otherwise remove the encoded metadata from the broadcast signal 110 prior to transmitting the primary AV signal 112.

In one embodiment, the one or more processors 120 may be configured to transmit the broadcast signal 110 from the receiver 118 to a signal extraction module 106. For example, as shown in FIG. 1B, the signal extraction module 106 may be contained/stored within memory 122. In additional and/or alternative embodiments, the signal extraction module 106 may be located outside the first media device 102 and communicatively coupled to the first media device 102 via wired and/or wireless communication protocols. For instance, the first media device 102 may be communicatively coupled to an extraction module 106 via audio signal, radio frequency signal, wireline connection, and the like.

In another embodiment, the signal extraction module 106 is configured to identify embedded steganographic metadata within the broadcast signal 110, extract a payload from the identified steganographic metadata, and convert the embedded/extracted payload/steganographic metadata to a steganographic metadata signal 114. In this regard, the one or more processors 120 may be configured to analyze the broadcast signal 110 containing steganographic metadata, via the signal extraction module 106, and extract a steganographic metadata signal 114. For example, the first media device 102 may processes the steganographic metadata directly from a file (e.g., mp3, wav, mp4, mov, etc.) such that the steganographic metadata is decoded via the signal extraction module 106.

In additional and/or alternative embodiments, steganographic metadata may be received and/or analyzed by one or more microphones 146 of the first media device 102. For example, a broadcast signal 110 containing steganographic metadata may be received by a receiver 118 of the first media device 102. Subsequently, the one or more processors 120 of the first media device 102 may transmit the broadcast signal 110 to the output unit 124, and generate one or more control signals configured to cause the output unit 124 to convert the broadcast signal 110 containing steganographic metadata to primary A/V signals 114 perceivable by the end user 108 via the speaker 126 and/or display 128. Upon transmission of the primary A/V signals 112, one or more microphones 146 within the first data device 102 may be configured to receive the sound produced by the speakers 126 (e.g., receive primary A/V signals 112), and transmit one or more signals to the signal extraction module 106 in response to the received audio. The signal extraction module 106 may then be configured to receive the one or more audio signals from the microphone 126, which includes the embedded steganographic metadata, and extract a payload from the steganographic metadata.

By way of another example, a television (e.g., first media device 102) may utilize an internal microphone 146 to receive an audio signal (e.g., primary A/V signal 112) produced by the television that contains steganographic metadata and transmit the audio signal received by the internal microphone 146 to the signal extraction module 106 to detect and extract a payload from the steganographic metadata. In this example, the one or more processors 120 may be configured to analyze the audio signal received from the microphone 146 and convert the audio signal to a steganographic metadata signal 114.

While the microphone 146 is illustrated in FIG. 1B as a component of the first media device 102, this is not to be regarded as a limitation of the present disclosure, unless noted otherwise herein. In this regard, system 100 may include one or more microphones or visual devices separate from the first media device 102 which are configured to receive primary A/V signals 112 and identify steganographic metadata stored within the primary A/V signals 112. For example, the one or more microphones 146 may include stand-alone microphones separate from the first media device 102 which are configured to receive the primary A/V signals 112, identify steganographic metadata embedded within audio signals of the primary A/V signals 112, and transmit the identified steganographic metadata to the first media device 102 and/or second media device 104. By way of another example, system 100 may include one or more stand-alone visual devices (e.g., cameras) separate from the first media device 102 which are configured to receive the primary A/V signals 112, identify steganographic metadata embedded within video signals of the primary A/V signals 112, and transmit the identified steganographic metadata to the first media device 102 and/or second media device 104. In these examples, the microphones 146 and visual devices (e.g., cameras) may each include memory, processor, and transmitter components.

In another embodiment, the one or more processors 120 are configured to cause the transmitter 144 to transmit the steganographic metadata signal 114 to one or more second media devices 104. The steganographic metadata signal 114 may be transmitted using any communication protocol known in the art including, but not limited to, Wi-Fi, Wi-Fi direct, TCP/IP, Bluetooth®, Bluetooth low energy, and the like. It is contemplated herein that extracting the payload from the steganographic metadata, removing the payload/steganographic metadata from the broadcast signal 110/primary A/V signal 112, and encoding the payload/steganographic metadata within the steganographic metadata signal 114 after extraction may avoid negative viewing and/or listening experiences of the end user 108 when perceiving the primary A/V signals 112. The steganographic metadata may be encoded within a pure audio file (e.g., mp3), way file, or a video file containing audio.

In another embodiment, the signal extraction module 106 includes a set of one or more functions performed by software. For example, the one or more processors 120 may execute a set of program instructions of the signal extraction module 106 stored in memory 122 to accomplish the actions that are performed by the extraction module 106. In this embodiment, software may extract a payload of the steganographic metadata from a media file (e.g., broadcast signal 110) received by the first media device 102. For example, software may play a media file, extract a payload from the steganographic metadata from the media file, and transmit the steganographic metadata signal 114 to one or more second media devices 104 (e.g., smartphone, tablet, laptop, smart watch) in response to the extracted payload/steganographic metadata.

In another embodiment, the second media device 104 includes, but is not limited to, a receiver 148, one or more processors 130, a memory 132, and an output unit 134. In one embodiment, the one or more processors 130 may be configured to receive the steganographic metadata signal 114 via receiver 148. The receiver 148 may be configured to receive any signal known in the art including, but not limited to, sound wave signals, an A/V signals, radio frequency (RF) signals, digital signals (e.g., data packets), Wi-Fi signals, Wi-Fi direct signals, TCP/IP signals, Bluetooth signals, Bluetooth low energy signals, and the like. It is noted herein that utilizing a traditional transmission method (e.g., Bluetooth) may enable a second media device 104 to receive the steganographic metadata signal 114 without the need to be in a "listening mode," thereby eliminating privacy and battery usage concerns associated with conventional systems and methods. It is further noted herein that applications ("apps") used by the second media device 104 to receive the steganographic metadata signal 114 may run in the background of the second media device 104, further alleviating privacy concerns and prolong battery life. The one or more apps may be stored within the memory 132 of the second media device 104.

In another embodiment, the one or more processors 120 may be configured to analyze the received steganographic metadata signal 114 and identify one or more data identifiers within the steganographic metadata signal 114. As it is used herein, the term "data identifiers" may include any bits of data within the steganographic metadata signal 114 which are configured to cause the processors 130 of the second media device 104 to execute an action. The one or more processors 120 may then be configured to store the determined data identifiers in memory 132 and transmit one or more control signals configured to cause the output unit 134 to execute one or more actions. The output unit 134 may then be configured to execute one or more actions in response to the data identifiers. For example, the output unit 134 may be configured to generate one or more supplementary A/V signals 116 in response to the received steganographic metadata and/or identified data identifiers. The supplementary A/V signals 116 may then be perceived (e.g., seen, heard) by the end user 108 via the second media device 104.

In one embodiment, the output unit 134 includes one or more speakers, a display 138, a camera 140, and one or more vibration units 142. In this regard, the one or more supplementary A/V signals 116 generated in response to the received steganographic metadata signals 114 (data identifiers) may include any A/V signals known in the art. For example, the one or more supplementary A/V signals 116 may include, but are not limited to, an audio notification emitted by one or more speakers 136 of the output unit 134, a notification depicted on a display 138 of the output unit 134, an executable/selectable URL displayed on a display 138 of the output unit 134, an advertisement displayed on a display 138 of the output unit 134, a vibration indicative of a notification generated by the vibration unit 142, and the like.

For example, a television may receive a broadcast signal 110, analyze and extract a payload from the steganographic metadata within the broadcast signal 110, and transmit a steganographic metadata signal 114 in response to the extracted payload/steganographic metadata to one or more nearby second media devices 104. For instance, software running on the television (e.g., first media device 102) may extract a payload from the steganographic metadata within the broadcast signal 110 and transmit a steganographic metadata signal 114 generated in response to the extracted steganographic metadata to one or more nearby second media devices 104. Continuing with the same example, the one or more processors 130 of a second media device 104 may analyze the received steganographic metadata signal 114, and identify one or more data identifiers within the steganographic metadata signal 114. The one or more processors 130 may then be configured to store the data identifiers in memory 132, and generate one or more control signals configured cause the output unit 134 to perform one or more functions/actions in response to the data identifiers. For example, a SmartTV running a streaming application (e.g., Netflix, Hulu) may serve as the first media device 102. In this example, the Smart TV (e.g., first media device 102) may be configured to extract a payload from the steganographic data, either directly from the streamed media or from a database using ACR, and subsequently transmit a BLE advertisement to nearby second media devices 104.

Another example of how signals and data flow through system 100 may prove to be illustrative. In this example, media file within a broadcast signal 110 is modified (e.g., encoded) to include a content identification marker (content ID marker), which reads "300.218.19". The content ID marker is also prefixed with a "watermark." For example, the ASCII characters "CUE," separated by "." characters, making the entire content ID marker read "67.85.69.300.218.19." This content ID marker is then embedded into the media file at a specific timecode within the broadcast signal 110 in a manner that is minimally disruptive to the viewing experience of an end user 108. For instance, the content ID marker may be steganographically encoded within the video or audio channels of the broadcast signal 110 by modifying the colors of a few frames (visual steganography) or by including near-ultrasonic frequencies within the audio signals (audio steganography). In this example, the content ID marker may be encoded within the broadcast signal 110 at the 30 second mark of a program using near-ultrasonic frequencies. It is noted herein that any encoding algorithm known in the art may be used to encode the content ID marker within the broadcast signal 110, so long as the payload "67.85.69.300.218.19" can be easily encoded and later decoded from the broadcast signal 110.

Continuing with the same example, the broadcast signal 110 may be received by a first media device 102, and the first media device 110 may transmit the encoded steganographic metadata to the smartphone (e.g., second media device 104) of an end user 108 via a BLE advertisement or packet, Bluetooth, WiFi, or the like. The smartphone of the end user 108 may subsequently detect the payload "67.85.69.300.218.19" at roughly 30 seconds into the program, associated with a Service ID as is expected in a well-formed BLE Advertising Packet. The one or more processors 130 of the smartphone, or an app running in the foreground or background of the smartphone, may be configured to scan for this Service ID and/or associated payload.

For instance, the one or more processors 130 may first choose to verify the packet further by identifying a watermark (e.g., "67.85.69"). If the watermark is correct, the processors 130 may choose to make use of the remaining payload (i.e., "300.218.19"). For example, the processors 130 may look up a longer "value" (e.g., an image in a database) payload associated with the "key" (e.g., 300.218.19) on a remote server or in memory 132. It is contemplated herein that embodiments where the processors 130 access "values" or other data which is associated with a particular "key" within embedded metadata may effectively enable the transmission of much more data through communication protocols (e.g., Bluetooth low-energy) than would otherwise be supported.

Upon detecting the payload, the one or more processors 130 of the smartphone (e.g., second media device) may utilize the data (e.g., "67.85.69.300.218.19") for whatever purpose. In this regard, the payload "67.85.69.300.218.19" may be considered as a data identifier which is configured to cause the smartphone to execute one or more actions based on the payload. For example, the associated, larger payload may inform the processors 130 of the second media device 104 (e.g., smartphone) to cause the display 138 to display a notification which reads "Click here to view Behind the Scenes content!" which would trigger at roughly 30 seconds into the program.

By way of another example, an application running on the second media device 104 (e.g., smartphone) may receive the payload "300.218.19" at only 30 seconds in to a specific media file. In this example, the application could display relevant information related to a combination of that timecode and program, such as actors and actresses appearing on-screen at the 30 second mark, or limited-time offers associated with the program. Moreover, new types of A/V programs executed by a first media device 102 may utilize embodiments of the present disclosure to implement second screen experiences, such as game shows in which users participate on their smartphone, regardless if they are "viewing live" or via playback.

Figure 1C:
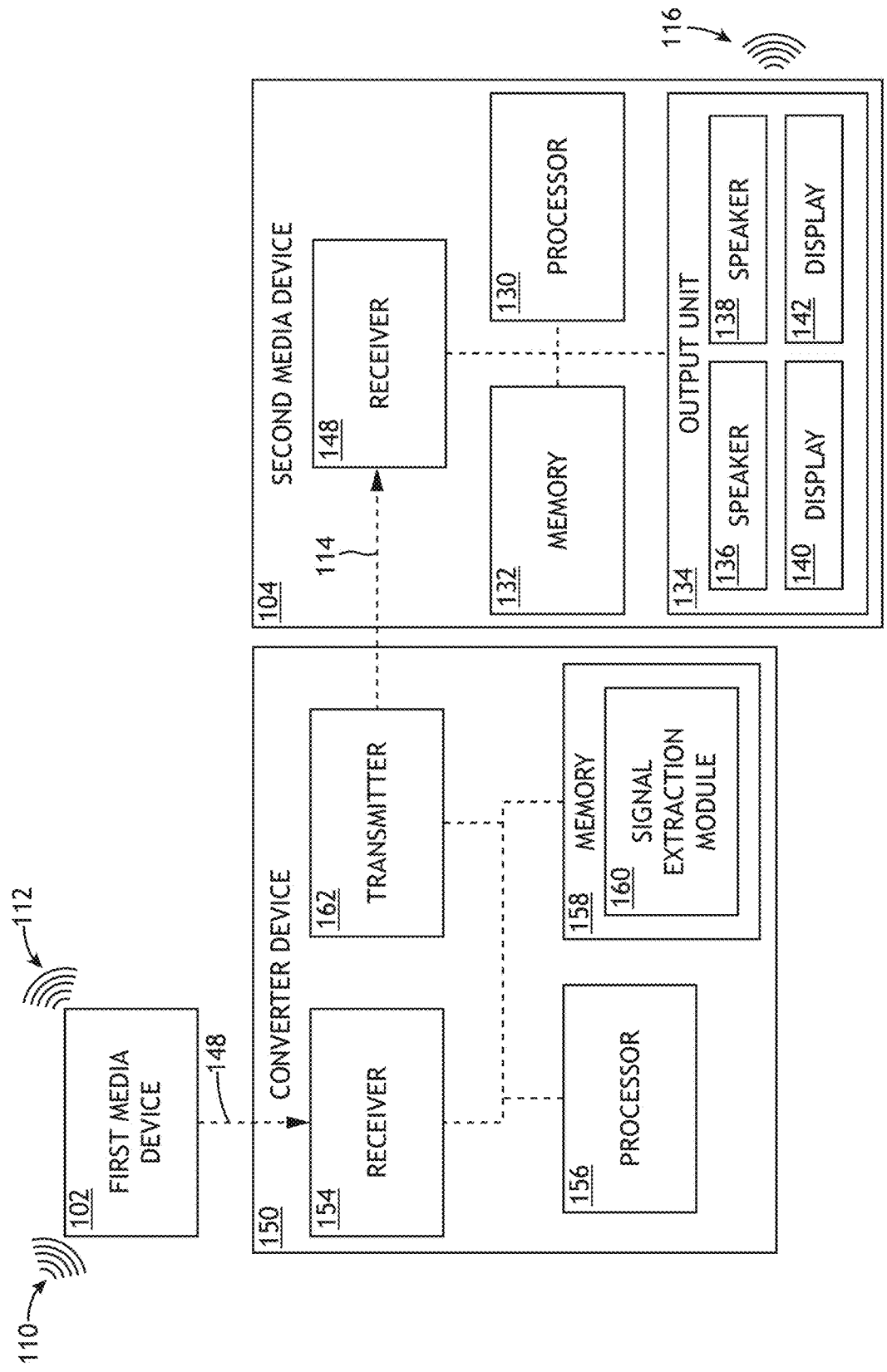
FIG. 1C illustrates a simplified block diagram of a system for providing second screen experiences, in accordance with one or more embodiments of the present disclosure.

FIG. 1C illustrates a simplified block diagram of a system 100 for providing second screen experiences, in accordance with one or more embodiments of the present disclosure. More specifically, FIG. 1D illustrates a simplified block diagram of a system for transmitting steganographic metadata from a signal converter device 150 to a second media device 104. It is noted herein that any discussion associated with system 100 illustrated in FIGS. 1A-1B may be regarded as applying to system 100 illustrated in FIG. 1C, unless noted otherwise herein. Similarly, it is noted herein that any discussion associated with system 100 illustrated in FIG. 1C may be regarded as applying to system 100 illustrated in FIGS. 1A-1B, unless noted otherwise herein.

As noted previously herein, system 100 may include one or more first media devices 102 (e.g., television, radio, electronic advertising kiosk, jumbotron) configured to receive broadcast signals 110 and transmit primary A/V signals 112 to an end user 108 in response to the broadcast signals 110. In additional and/or alternative embodiments, the extraction of a payload from the steganographic metadata of the broadcast signals 110, and subsequent transmission to the second media device 104, may be performed by one or more converter devices 150.

Accordingly, the first media device 102 may be configured to transmit one or more signals 148 to the converter device 150, via transmitter 144, such that the converter device 150 may perform steganographic metadata extraction functions of the present disclosure. It is contemplated herein that the converter device 150 may include a converter device which is communicatively coupled to, or located proximate to, a first media device 102. For example, in the context of a television (e.g., first media device 102), the converter device 150 may include, but is not limited to, an Apple TV device, Roku, Amazon Alexa, Google Chromecast, Google Home, and the like.

The one or more converter devices 150 may include, but are not limited to, a receiver 154, one or more processors 156, a memory 158 including a signal extraction module 160, and a transmitter 162. In one embodiment, the one or more processors 156 of the converter device 150 are configured to cause the receiver 154 to receive one or more signals 152 steganographic metadata from the first media device 110. The receiver 154 may be configured to receive any signal known in the art including, but not limited to, sound wave signals, an A/V signals, radio frequency (RF) signals, digital signals (e.g., data packets), Wi-Fi signals, Wi-Fi direct signals, TCP/IP signals, Bluetooth signals, Bluetooth low energy signals, and the like.

In some embodiments, the signals 152 may include the original broadcast signals 110 such that the first media device 102 simply "forwards" or "relays" the broadcast signals 110. For example, a home automated system such as a Google Home, Amazon Alexa, and the like (e.g., converter device 150) may receive a broadcast signal 110 containing steganographic metadata from a television (e.g., first media device 102). By way of another example, the converter device 150 may be configured to receive the broadcast signals 110 directly, such that the one or more signals 152 include the broadcast signals 110 transmitted directly from the broadcast signal sources 101a, 101b.

By way of another example, the first media device 102 may be configured to receive the broadcast signals 110 and remove the embedded metadata before transmitting the primary A/V signals 112 so as to remove embedded data which may affect the viewing/listening experience of the end user 108 when perceiving primary A/V signals 112. For instance, a television (e.g., first media device 102) may remove embedded visual and audio metadata which may be heard or seen by some viewers, and creating a negative impact on the viewing/listening experience. In this regard, the primary A/V signals 112 may be transmitted without embedded metadata, and the extracted payload/steganographic metadata may be transmitted to the converter device 150 and/or second media device 104 via signals 152 and steganographic metadata signals 114, respectively.

In another embodiment, the one or more processors 156 are configured to transmit the one or more signals 148 to the signal extraction module 160. The one or more processors 156 may then be configured to execute a set of program instructions configured to cause the signal extraction module 160 to analyze the broadcast signal 110 containing steganographic metadata and extract a steganographic metadata signal 114. In this regard, the signal extraction module 160 may be configured to identify embedded steganographic metadata within the broadcast signal 110, and extract a payload from the identified steganographic metadata. The one or more processors 156 may be configured to store extracted payloads/steganographic metadata in memory 158. The one or more processors 156 may then be further configured to generate one or more control signals configured to cause the transmitter 162 to transmit the steganographic metadata signal 114 to the one or more second media devices 104.

It is noted herein that a converter device 150 may be used in contexts in addition to converter devices 150 communicatively coupled to residential televisions. For example, a converter device 150 may be communicatively coupled to a display of a large venue (e.g., stadium jumbotron, arena scoreboard, convention center display, and the like) which functions as a first media device 102. The converter device 150 may be configured to receive the same A/V input (e.g., broadcast signal 110) as the first media device 102 (e.g., jumbotron) via any wireline and/or wireless connection. In one embodiment, the converter device 150 may detect steganographic metadata in the A/V input transmitted to the display (e.g., jumbotron), and generates a response to the detected steganographic metadata that is transmitted to nearby devices (e.g., via a Bluetooth transmitter) as steganographic metadata signal 114.

In this example, one or more nearby second media devices 104 (e.g., mobile devices, smartphones) within the vicinity of the display (e.g., jumbotron) may be configured to execute an action in response to the steganographic metadata signal 114 (e.g., in response to one or more data identifiers within the steganographic metadata signal 114). As noted previously, the one or more second media devices 104 may be configured to execute actions in response to data identifiers within the steganographic metadata signal 114 even if the receiving application is in the background, such as in a "local" or "push" notification. By way of another example, a software component (e.g., a media player plugin) of a first media device 102 (e.g., jumbotron) may extract a payload from the steganographic metadata of the broadcast signal 110 and transmit the extracted payload/steganographic metadata to a converter device 150. It is noted herein that when a payload/metadata is extracted and then sent to a converter device 150, the converter device 150 may not need to extract the payload/steganographic metadata from a signal, but would transmit data as instructed by the steganographic metadata to all receiving second media devices 104 within range via a Bluetooth or Bluetooth Low Energy signal.

In some embodiments, extraction of a payload/steganographic metadata and/or creation of a steganographic metadata signal 114 may be performed by a third party. For example, a payload may be extracted from a media file within a broadcast signal 110 by a third party and transmitted to a converter device 150 via a wired or wireless connection. For instance, a payload of a steganographic signal extracted from a media file within a broadcast signal 110 by a third party may be communicated with a converter device 150 by a direct A/V connection. By way of another example, a third party may extract a steganographic signal from a media file via software connected to a media player and communicate the extracted signal with a converter device 150 via a network.

It is noted herein that the system and method of the present disclosure may provide a number of benefits over previous approaches indented to provide a second screen experience. In particular, by relaying the audio/visual metadata (e.g., steganographic metadata signal 114) through a traditional medium of transmission (e.g., Bluetooth, and the like), system 200 avoids several significant roadblocks to improving and popularizing second screen experiences, especially those that relied on a data-over-audio approach. For example, system 200 enables steganographic metadata to be encoded within the video layer ("metadata-in-video") of the broadcast signal 110. Previously, in order to implement metadata-in-video, the "second screen" would have needed a video input (e.g., camera) focused on a display 128 of the first media device 102 in order to access metadata embedded in the video layer. By decoding and re-transmitting the metadata through Bluetooth, Wi-Fi, etc., metadata can now be included in the video layer using visual steganographic techniques.

Additionally, the infrastructure for delivering data through traditional mediums such as Wi-Fi and Bluetooth is significantly more developed than pure data-over-audio (e.g., speaker 126 to microphone of second media device 104) solutions currently available. For example, many Internet of Things (IoT) devices are equipped with the hardware to receive Bluetooth and/or WiFi signals, but not audio signals. Accordingly, by enabling steganographic metadata to be transmitted via Bluetooth or WiFi, instead of audio signals, the breadth of compatible devices for system 200 may be greatly expanded. Moreover, by relaying steganographic metadata over a different medium, effects of environmental noise, echoes, and unusual acoustic environments may be avoided, thereby increasing the effective transmission range between the first media device 102 and the second media device 104 can be massively increased.

Finally, by transmitting the audio/visual metadata (e.g., steganographic metadata signal 114) through a traditional medium of transmission, "Second Screens" (e.g., second media devices 104) can be aware of exactly what is displayed on the "Primary Screen" (e.g., first media device 102) at all times through a real-time input through Bluetooth, Wi-Fi, etc.

It is contemplated herein that system 100 of the present disclosure may be configured to enable improved second screen experiences without encoding metadata within, or otherwise modifying, the source media of the broadcast signal 110. In additional and/or alternative embodiments, rather than modify the source media file (e.g., broadcast signal 110) with a content ID marker at a specific timecode, the one or more processors 120, 130, 156 and/or signal extraction module 106, 160 may be configured to receive the un-encoded signals (e.g., un-encoded broadcast signal 110) and reference an Automatic Content Recognition (ACR) system. Automatic content recognition (ACR) is technology which recognizes audio snippets without direct insertion of additional audio within an audio signal. ACR typically involves extracting a set of feature vectors from audio signal, and matching the extracted feature vectors against a stored database of such feature vectors in order to identify the content.

For example, in an ACR system, content ID markers can be associated with specific timecodes in a program ad-hoc. For instance, an excerpt of the program associated with the broadcast signal 110 may be incorporated and/or saved within the database of recognized content of the ACR system as a content ID. The database of the ARC system may be stored in memory 122, 132, 158 and/or in a remote server accessible via a network connection. Continuing with the same example, the processors 120, 130, 158 may be configured to recognize the content ID marker (e.g., excerpt of the un-encoded broadcast signal 110) and use the identified content ID marker as an index in the database of recognizable supplementary content stored in memory 122, 132, 158 or remote server, either prefixed by a "watermark" or not. In this regard, the one or more processors 120, 130, 158 may be configured to identify recognizable supplementary content (e.g., supplementary media files) stored in a database which corresponds to the one or more content ID markers. This allows content ID markers to be effectively "inserted" into any arbitrary excerpt of a program (e.g., broadcast signal 110) without modifying the source media of the broadcast signal 110, so long as the excerpt is recognizable by the utilized ACR system.

By way of example, Company A may frequently advertise such that broadcast signals 110 transmitted to televisions (e.g., first media device 102) include media files for a Company A advertisement. In this example, the start of the media file for the Company A advertisement may be saved as a "content ID marker" within a supplementary content database of memory 122. In this example, the content ID marker may be associated with a supplementary media file for the Company A advertisement, which is stored in a supplementary content database stored on a remote server. Upon receiving a broadcast signal 110, the one or more processors 120 may be configured to identify the snippet of the broadcast signal 110 including the content ID marker, and access the media file associated with the content ID marker from the supplementary content database. The processors 120 may then be configured to transmit the small content ID associated with the snippet, such that a second media device 104 may receive the steganographic metadata signal 114 and execute the Company A advertisement in response to the supplementary media file.

It is noted herein that implementing embodiments of the present disclosure via ACR processes may require the second media device 104 to constantly run an ACR software or application operating in a "listening mode" in order for the second media device 104 to identify specific timecodes in a program the user is viewing. It is further noted herein that ACR may require licensing fees and increase data usage and network load. However, through ACR, some embodiments of the present disclosure may enable second screen experiences without having to directly modify the source media (e.g., broadcast signals 101), which may be tedious and computationally expensive.

Moreover, ACR embodiments may enable content producers to provide more flexible, tailored second screen experiences. For example, in embodiments where the broadcast signals 101 are modified to include embedded steganographic metadata associated with second screen content, the content associated with the steganographic metadata may not be altered after transmitting the source media (e.g., broadcast signals 101, streamed Netflix signals, streamed Hulu signals, and the like). In other words, once broadcast signals 101 are transmitted with steganographic metadata, the actions to be executed by the second media device 104 are "final," and may not be changed. Conversely, ACR does not require directly modifying the source media (e.g., broadcast signals 101), but rather utilizes content ID markers to refer to some supplemental content within a database. In this regard, with ACR embodiments, a content provider may modify supplemental content within the database without having to modify the original source media. In this regard, the supplemental content associated with a single content ID marker may be changed over time as desired.

In some embodiments, extraction of a payload from the steganographic metadata and/or creation of a steganographic metadata signal 114 may be performed by one or more servers. For example, operation of the signal extraction module 106 may be performed over one or more servers. It is noted herein that, in the case of a server performing the operations of the signal extraction module 106, the module, other functional components, and data may be implemented on one or more of, but not limited to, a single server, a cluster of servers, a server farm or data center, a cloud-hosted computing service, a cloud-hosted storage service, and the like.

By way of example, one or more servers may be configured to receive source media (e.g., broadcast signal 101). The one or more servers may be configured to identify metadata fields within the broadcast signal 101. For instance, MP4 files may include a metadata field indicating the length of the MP4 file. In a similar manner, source media (e.g., broadcast signal 101) may include additional metadata fields including timecodes, content ID markers, and the like. For instance, {"timecode":30.2, "contentID":274501} may be stored in a metadata field of source media, where "30.2" is a timecode and "274501" is a content ID marker. In this regard, the one or more servers may be configured to identify content ID markers in a metadata field of the source media, identify supplemental content associated with the identified content ID markers, and transmit the supplemental content to the second media devices 104 to enable a second screen experience.

In another embodiment, the one or more components of system 100 (e.g., first media devices 102, second media device 104) and the converter device 150 may each be coupled to each other in any wireless or wireline configuration known in the art including, but not limited to, DSL-based interconnection, cable-based interconnection, T9-based interconnection, GSM, GPRS, CDMA, EV-DO, EDGE, WiMAX, 3G, 4G, 4G LTE, 5G, Wi-Fi protocols, Bluetooth protocols, RF, LoRa, and the like.

It is further noted herein that the memory 122, 132, 158 may be used to store and maintain any number of functional components or modules that are executable by the processors 120, 130, 156. In one embodiment, these functional components comprise instructions or programs that are executable by the processors 120, 130, 156 and that, when executed, implement operational logic for performing the actions and functions attributed above to the system 100. Functional components of the signal extraction module 106, 160 stored in the memory 122, 132, 158 may include, but are not limited to, analyzing a broadcast signal 110, detecting steganographic metadata in a broadcast signal 110, extracting payloads/steganographic metadata, and generating a steganographic metadata signal 114 which may be transmitted to one or more second media devices 104. Additional functional components may include an operating system for controlling and managing various functions of the first media device 102, the second media device 104, and the converter device 150, and for enabling basic user interactions with the first media device 102, second media device 104, and the converter device 150. In addition, the memory 122, 132, 158 may store data used for performing the operations described herein. Further, the system 100 may include many other logical, programmatic and physical components, of which those described above are merely examples that are related to the discussion herein.

The memory 122, 132, 158 may include any storage medium known in the art suitable for storing program instructions executable by the associated one or more processors 120, 130, 156 and the data received/transmitted throughout system 100. For example, the memory 122, 132, 158 may include a non-transitory memory medium. For instance, the memory 122, 132, 158 may include, but is not limited to, a read-only memory (ROM), a random-access memory (RAM), a magnetic or optical memory device (e.g., disk), a magnetic tape, a solid-state drive and the like. In another embodiment, the memory 122, 132, 158 is configured to store data including, but not limited to, extracted payload/steganographic metadata, determined data identifiers, and the like. It is further noted that memory 122, 132, 158 may be housed in a common controller housing with the one or more processors 120, 130, 156. In an alternative embodiment, the memory 122, 132, 158 may be located remotely with respect to the physical location of the processors 120, 130, 156, and the like. In another embodiment, the memory 122, 132, 158 maintains program instructions for causing the one or more processors 120, 130, 156 to carry out the various steps described through the present disclosure.

In one embodiment, the one or more processors 120, 130, 156 may include any one or more processing elements known in the art. In this sense, the one or more processors 120, 130, 156 may include any microprocessor-type device configured to execute software algorithms and/or instructions. In one embodiment, the one or more processors 120, 130, 156 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 120, 130, 156. In general, the term "processor" may be broadly defined to encompass any device having one or more processing elements, which execute program instructions from memory 122, 132, 158. Moreover, different subsystems of the system 100 (e.g., first media device 102, second media device 104, converter device 150, and the like) may include processor or logic elements suitable for carrying out at least a portion of the steps described throughout the present disclosure. Therefore, the above description should not be interpreted as a limitation on the present disclosure but merely an illustration.

Figure 2:
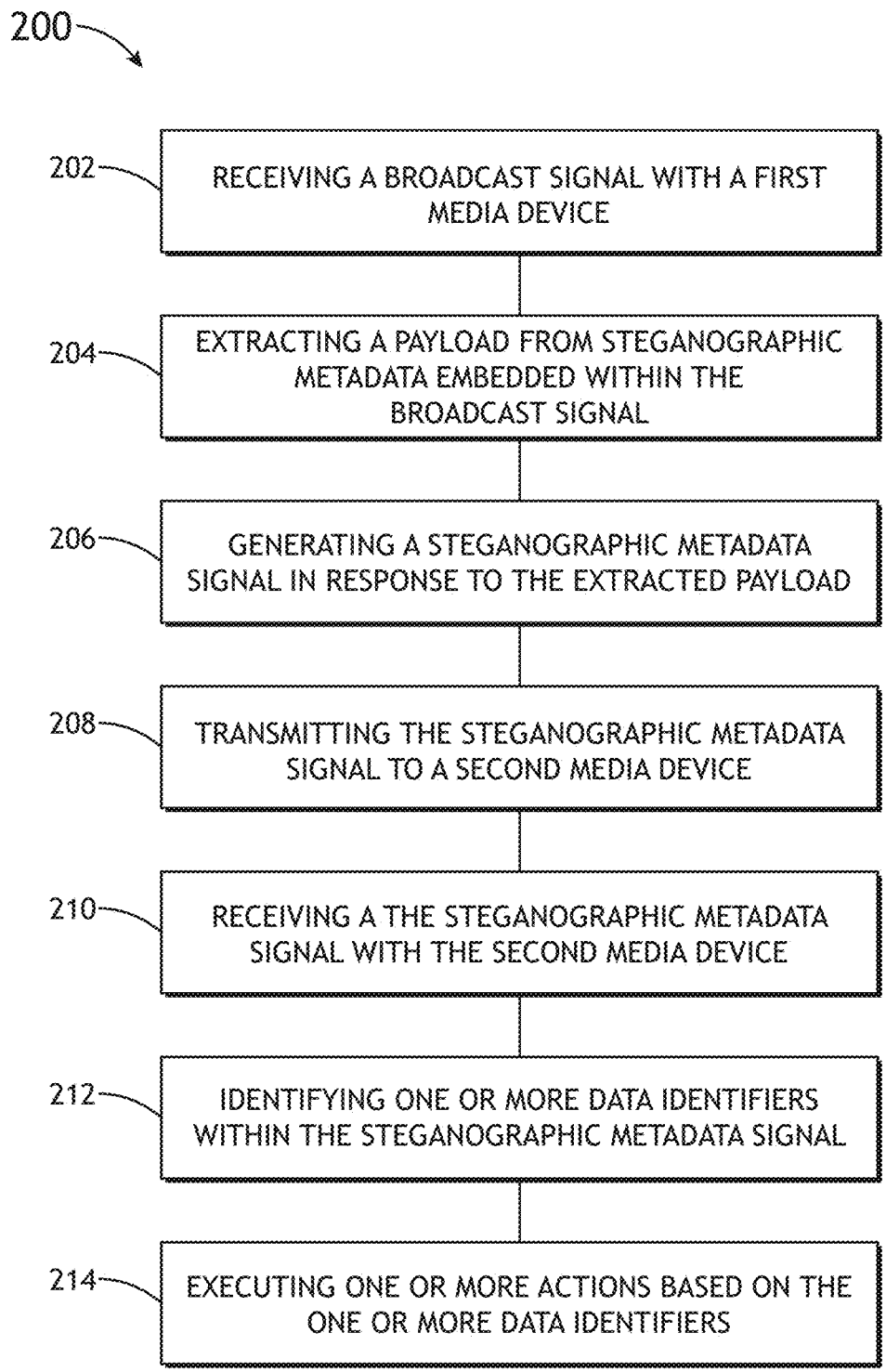
FIG. 2. illustrates a flowchart of a method for providing second screen experiences, in accordance with one or more embodiments of the present disclosure.

FIG. 2 illustrates a flowchart of a method 200 for providing second screen experiences, in accordance with one or more embodiments of the present disclosure. It is noted herein that the steps of method 200 may be implemented all or in part by the system 100 and/or a first media device 102 or a second media device 104. It is further noted herein that method 200 is not limited to system 100 and/or a first media device 102 or a second media device 104 in that additional or alternative system-level embodiments may carry out all or part of the steps of method 200.

In a step 202, a broadcast signal is received with a first media device. For example, as shown in FIG. 1A, one or more broadcast signal sources 101a, 101b may transmit a broadcast signal 110 to one or more first media devices 102. The first media devices 102 may include any electronic device known in the art including, but not limited to, a television, a radio, a jumbotron, an advertising kiosk, a jumbotron, and the like). The broadcast signal 110 may include an audio and/or video signal augmented with steganographic metadata.

In a step 204, a payload is identified/extracted from steganographic metadata embedded/encoded within the broadcast signal. For example, the one or more processors 120 of the first media device 102 may be configured to extract a payload from the steganographic metadata embedded within audio and/or visual signals of the broadcast signal 110 with the signal extraction module 106. Extracted steganographic metadata may be stored in memory 122.

In a step 206, a steganographic metadata signal 114 is generated in response to the extracted payload. For example, the one or more processors 120 may be configured to generate a steganographic metadata signal 114 including the extracted steganographic metadata.

In a step 208, the steganographic metadata signal is transmitted to a second media device. For example, the one or more processors 120 may be configured to cause the transmitter 144 of the first media device 102 to transmit the steganographic metadata signal 114 to one or more second media devices 104. The one or more second media devices 104 may include any electronic device known in the art including, but not limited to, a smartphone, a tablet, a laptop, a smart watch, and the like. Additionally, the steganographic metadata signal 114 may be transmitted from the first media device 102 to the one or more second media devices 104 using any communication protocol known in the art including, but not limited to, sound wave signals, an NV signals, radio frequency (RF) signals, digital signals (e.g., data packets), Wi Fi signals, Wi-Fi direct signals, TCP/IP signals, Bluetooth signals, Bluetooth low energy signals, and the like.

In a step 210, the steganographic metadata signal is received by the second media device. For example, as shown in FIG. 1A and FIG. 1B, a smartphone (e.g., second media device 104) may receive the steganographic metadata signal 114 via a receiver 148.

In a step 212, one or more data identifiers are identified within the steganographic metadata signal. For example, the one or more processors 130 of a second media device 104 may analyze the received steganographic metadata signal 114, and identify one or more data identifiers within the steganographic metadata signal 114. As it is used herein, the term "data identifiers" may include any bits of data within the steganographic metadata signal 114 which are configured to cause the processors 130 of the second media device 104 to execute an action. The one or more processors 130 may then be configured to store the data identifiers in memory 132.

In a step 214, one or more actions are executed by the second media device in based on the one or more data identifiers. For example, the one or more processors 130 of the second media device 104 may be configured to generate one or more control signals configured cause the output unit 134 to perform one or more functions/actions in response to the data identifiers. The output unit 134 may then be configured to execute one or more actions in response to the data identifiers. For example, the output unit 134 may be configured to generate one or more supplementary A/V signals 116 in response to the received steganographic metadata. The supplementary A/V signals 116 may then be perceived (e.g., seen, heard) by the end user 108 via the second media device 104. For instance, the one or more supplementary A/V signals 116 may include, but are not limited to, an audio notification emitted by one or more speakers 136 of the output unit 134, a notification depicted on a display 138 of the output unit 134, an executable URL displayed on a display 138 of the output unit 134, an advertisement displayed on a display 138 of the output unit 134, a vibration indicative of a notification generated by the vibration unit 142, and the like.

Figure 3:
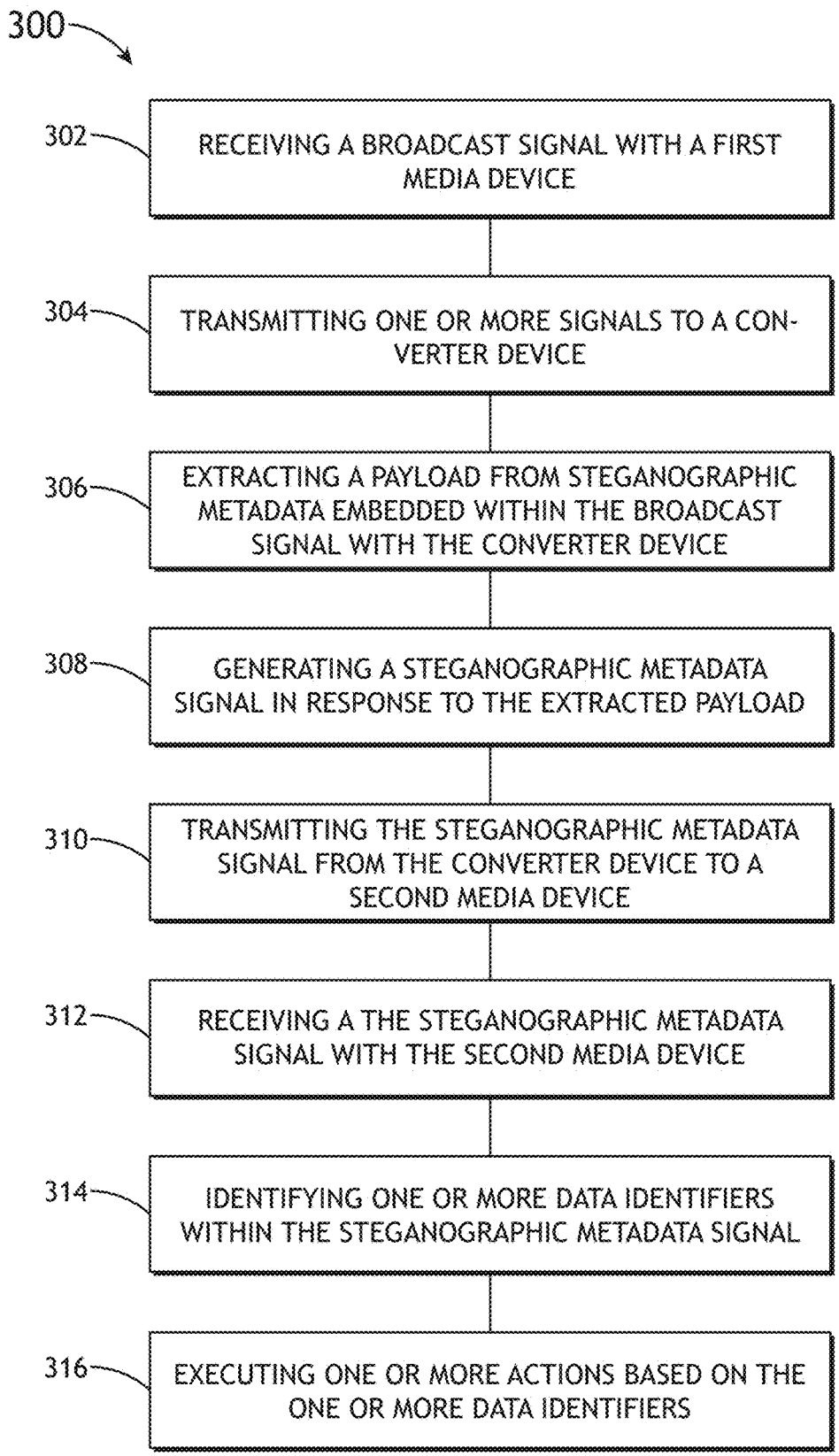
FIG. 3. illustrates a flowchart of a method for providing second screen experiences, in accordance with one or more embodiments of the present disclosure.

FIG. 3 illustrates a flowchart of a method 300 for providing second screen experiences, in accordance with one or more embodiments of the present disclosure. More specifically FIG. 3. illustrates a flowchart of a method 300 for transmitting steganographic metadata from a converter device 150 to a second media device 104. It is noted herein that the steps of method 300 may be implemented all or in part by the system 100 and/or a first media device 102 or a second media device 104 or a converter device 150. It is further noted herein that method 300 is not limited to the system 100 and/or a first media device 102 or a second media device 104 in that additional or alternative system-level embodiments may carry out all or part of the steps of method 300.

In a step 302, a broadcast signal is received with a first media device. For example, as shown in FIG. 1A, one or more broadcast signal sources 101*a*, 101*b* may transmit a broadcast signal 110 to one or more first media devices 102. The first media devices 102 may include any electronic device known in the art including, but not limited to, a television, a radio, a jumbotron, an advertising kiosk, a jumbotron, and the like. The broadcast signal 110 may include an audio and/or video signal augmented with steganographic metadata.

In a step 304, one or more signals are transmitted to a converter device. For example, as shown in FIG. 1C, the first media device 102 may transmit one or more signals 148 to a converter device 150. The converter device 150 may include any electronic device communicatively couplable to the first media device 102 and/or the second media device 104 including, but not limited to, an Apple TV device, Roku, Amazon Alexa, Google Chromecast, Google Home, and the like. It is noted herein that the signals 148 may include the original broadcast signals 110 such that the first media device 102 simply "forwards" or "relays" the broadcast signals 110. For example, a home automated system such as Google Home, Amazon Alexa, and the like (e.g., converter device 150) may receive a broadcast signal 110 containing steganographic metadata from a television (e.g., first media device 102). By way of another example, the converter device 150 may be configured to receive the broadcast signals 110 directly, such that the one or more signals 148 include the broadcast signals 110 transmitted directly from the broadcast signal sources 101*a*, 101*b*.

In a step 306, a payload is identified/extracted from steganographic metadata embedded within the broadcast signal. For example, the one or more processors 156 of the converter device 1502 may be configured to extract steganographic metadata embedded within audio and/or visual signals of the broadcast signal 110 with the signal extraction module 160. Extracted steganographic metadata may be stored in memory 158.

In a step 308, a steganographic metadata signal 114 is generated in response to the extracted payload. For example, the one or more processors 156 may be configured to generate a steganographic metadata signal 114 including the extracted steganographic metadata.

In a step 310, the steganographic metadata signal is transmitted to a second media device. For example, the one or more processors 156 may be configured to cause the transmitter 162 of the converter device 150 to transmit the steganographic metadata signal 114 to one or more second media devices 104.

In a step 312, the steganographic metadata signal is received by the second media device. In a step 314, one or more data identifiers are identified within the steganographic metadata signal. In a step 316, one or more actions are executed by the second media device in based on the one or more data identifiers. For example, the one or more processors 130 of the second media device 104 may be configured to generate one or more control signals configured cause the output unit 134 to perform one or more functions/actions in response to the data identifiers. The output unit 134 may then be configured to execute one or more actions in response to the data identifiers. For example, the output unit 134 may be configured to generate one or more supplementary A/V signals 116 in response to the received steganographic metadata.

Figure 4:
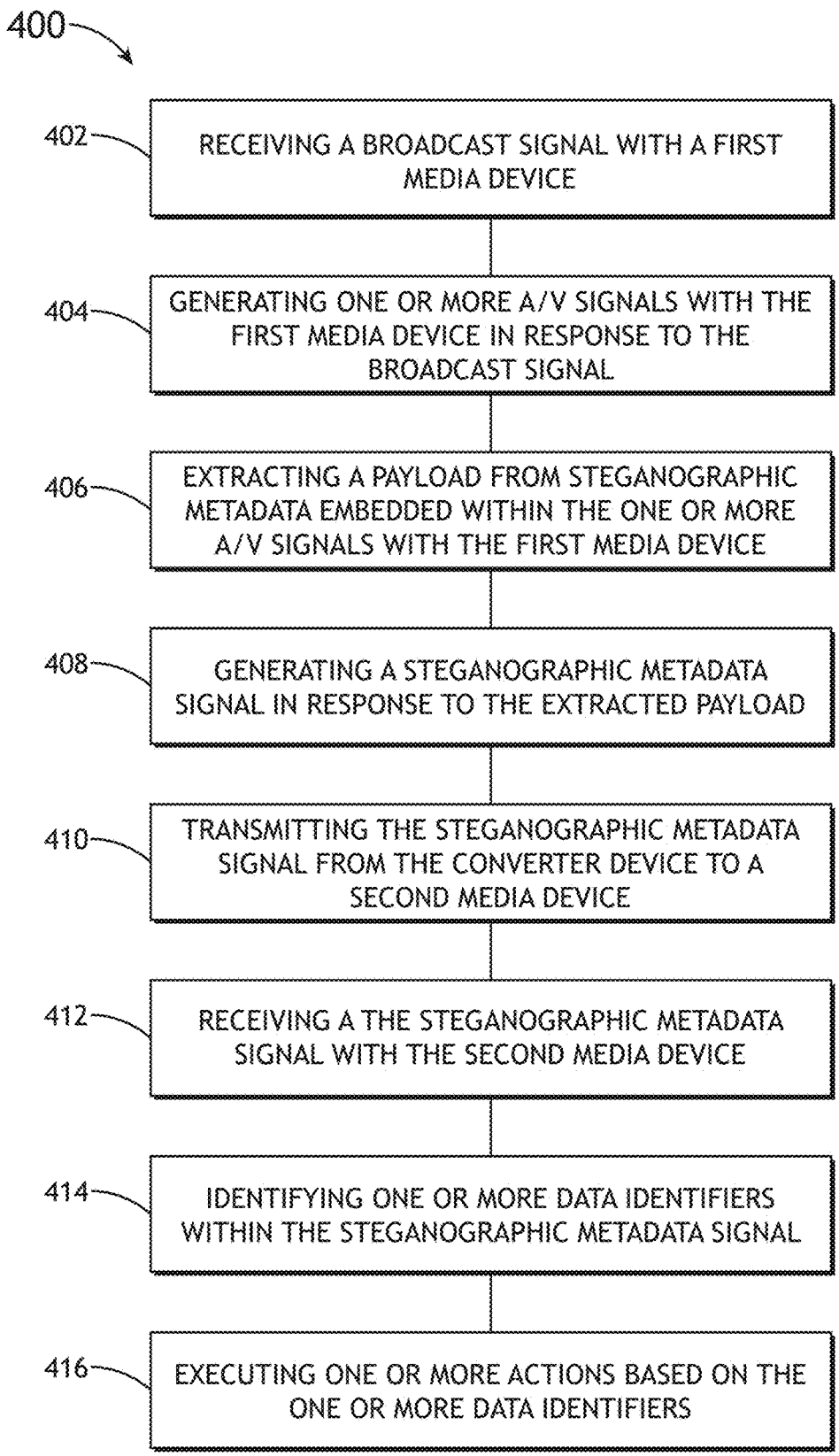
FIG. 4. illustrates a flowchart of a method for providing second screen experiences, in accordance with one or more embodiments of the present disclosure.

FIG. 4 illustrates a flowchart of a method 400 for providing second screen experiences, in accordance with one or more embodiments of the present disclosure. More specifically, FIG. 4 illustrates a flowchart of a method 400 for transmitting steganographic metadata from a first media device 102 to a second media device 104. It is noted herein that the steps of method 400 may be implemented all or in part by system 100 and/or a first media device 102 or a second media device 104. It is further noted herein that method 400 is not limited to system 100 and/or a first media device 102 or a second media device 104 in that additional or alternative system-level embodiments may carry out all or part of the steps of method 400.

In a step 402, a broadcast signal is received with a first media device. For example, as shown in FIG. 1A, one or more broadcast signal sources 101a, 101b may transmit a broadcast signal 110 to one or more first media devices 102. The first media devices 102 may include any electronic device known in the art including, but not limited to, a television, a radio, a jumbotron, an advertising kiosk, a jumbotron, and the like. The broadcast signal 110 may include an audio and/or video signal augmented with steganographic metadata.

In a step 404, one or more A/V signals are generated with the first media device in response to the broadcast signal 110. For example, a television (e.g., first media device 102) may receive a broadcast signal 110 and generate a primary A/V signal 112 which may be perceived (e.g., seen, heard) by an end user 108 in response to the broadcast signal 110. In this example, the one or more processors 120 of the first media device 102 may be configured to generate one or more control signals configured to cause output unit 134 including one or more speakers 126 and a display 128 to generate a television program which may be seen and/or heard by an end user 108 as primary A/V signals 112.

In a step 406, a payload is identified/extracted from steganographic metadata embedded within the one or more A/V signals via the first media device. For example, a television (e.g., first media device 102) may utilize an internal microphone 146 to receive an audio signal (e.g., primary A/V signal 112) produced by the television that contains steganographic metadata and transmit the audio signal received by the internal microphone 146 to the signal extraction module 106 to detect and extract the steganographic metadata. In this example, the one or more processors 120 may be configured to analyze the audio signal received from the microphone 146 and store extracted steganographic metadata in memory 122.

In a step 408, a steganographic metadata signal 114 is generated in response to the extracted steganographic metadata. For example, the one or more processors 156 may be configured to generate a steganographic metadata signal 114 including the extracted steganographic metadata.

In a step 410, the steganographic metadata signal is transmitted to a second media device. For example, the one or more processors 156 may be configured to cause the transmitter 162 of the converter device 150 to transmit the steganographic metadata signal 114 to one or more second media devices 104.

In a step 412, the steganographic metadata signal is received by the second media device. In a step 414, one or more data identifiers are identified within the steganographic metadata signal. In a step 416, one or more actions are executed by the second media device in based on the one or more data identifiers. For example, the one or more processors 130 of the second media device 104 may be configured to generate one or more control signals configured cause the output unit 134 to perform one or more functions/actions in response to the data identifiers. The output unit 134 may then be configured to execute one or more actions in response to the data identifiers. For example, the output unit 134 may be configured to generate one or more supplementary A/V signals 116 in response to the received steganographic metadata.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively, or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed:

1. A system for providing a second screen experience to an end user, comprising:
    a first media device comprising one or more processors and a memory, the one or more processors configured to execute a set of program instructions stored in memory, the set of program instructions configured to cause the one or more processors to:
        receive a broadcast signal encoded with primary audio/visual (AV) data and steganographic metadata;
        generate a primary audio/visual signal based on the primary AV data via an output device of the first media device, wherein the output unit includes at least one of a display or speaker, the steganographic metadata extracted from the broadcast signal prior to generating the primary audio/visual signal with the output device of the first media device;
        extract a payload, via an extraction module, from the steganographic metadata within the broadcast signal; and
        transmit a steganographic metadata signal, via a low energy bluetooth transmitter contained within the first media device, to a second media device, the steganographic metadata signal including the extracted payload, the first media device configured to dynamically change an emitted bluetooth signature of the low energy bluetooth transmitted based on the steganographic metadata encoded within the broadcast signal;
    wherein the second media device comprises one or more processors and a memory, the one or more processors configured to execute a set of program instructions stored in memory, the set of program instructions configured to cause the one or more processors to:
        receive, via a low energy bluetooth receiver, the bluetooth steganographic metadata signal from the first media device;
        determine one or more data identifiers within the received payload of the bluetooth steganographic metadata signal; and
        generate a supplementary AV signal with an output unit of the second media device, the supplementary output signal based on the one or more data identifiers.

2. The system of claim 1, wherein the generating a supplementary audio/visual signal with an output unit of the second media device comprises:
    generating an audio notification associated with the primary AV signal with one or more speakers of the second media device, and
    generating a visual notification associated with the primary AV signal with a display of the second media device.

3. The system of claim 1, wherein the generating a supplementary audio/visual signal with an output unit of the second media device comprises:
    displaying a selectable link associated with the primary AV signal on a display of the second media device, and
    displaying an advertisement associated with the primary AV signal on the display of the second media device.

4. The system of claim 1, wherein the one or more processors of the first media device are configured to:
  receive the primary AV signal with one of a microphone or a camera of the first media device, and
  extract a payload of the steganographic metadata from the primary AV signal.

5. The system of claim 1, wherein
  the first media device comprises at least one of a television, a radio, an advertising kiosk, and a jumbotron, and
  the second media device comprises at least one of a smartphone, a tablet, and a smart watch.

6. A system for providing a second screen experience to an end user, comprising:
  a first media device comprising one or more processors and a memory, the one or more processors configured to execute a set of program instructions stored in memory, the set of program instructions configured to cause the one or more processors to:
    receive a broadcast signal encoded with primary audio/visual (AV) data and steganographic metadata;
    generate a primary audio/visual signal based on the primary AV data via an output device, wherein the output unit includes at least one of a display or speaker, the steganographic metadata extracted from the broadcast signal prior to generating the primary audio/visual signal with the output device of the first media device;
    extract a payload, via an extraction module, from the steganographic metadata within the broadcast signal; and
    transmit a steganographic metadata signal, via a low energy bluetooth transmitter contained within the first media device, to a second media device, the steganographic metadata signal including the extracted payload, the first media device configured to dynamically change an emitted bluetooth signature of the low energy bluetooth transmitted based on the steganographic metadata encoded within the broadcast signal,
  wherein the second media device is configured to generate a supplementary AV signal with an output unit of the second media device, the supplementary output signal based on one or more data identifiers within the extracted payload.

7. The system of claim 6, wherein the generating a supplementary audio/visual signal with an output unit of the second media device comprises:
  generating an audio notification associated with the primary AV signal with one or more speakers of the second media device, and
  generating a visual notification associated with the primary AV signal with a display of the second media device.

8. The system of claim 6, wherein the generating a supplementary audio/visual signal with an output unit of the second media device comprises:
  displaying a selectable link associated with the primary AV signal on a display of the second media device, and
  displaying an advertisement associated with the primary AV signal on the display of the second media device.

9. The system of claim 6, wherein the one or more processors of the first media device are configured to:
  receive the primary AV signal with one of a microphone or a camera of the first media device, and
  extract the payload of the steganographic metadata from the primary AV signal.

10. The system of claim 6, wherein
  the first media device comprises at least one of a television, a radio, an advertising kiosk, and a jumbotron, and
  the second media device comprises at least one of a smartphone, a tablet, and a smart watch.

11. A system for providing a second screen experience to an end user, comprising:
  a first media device comprising one or more processors and a memory, the one or more processors configured to execute a set of program instructions stored in memory, the set of program instructions configured to cause the one or more processors to:
    receive a broadcast signal encoded with primary audio/visual (AV) data and steganographic metadata;
    identify one or more content identifier (ID) markers within the steganographic metadata of the broadcast signal;
    identify supplementary content associated with the one or more content ID markers within a supplementary content database; and
    transmit a steganographic metadata signal, via a low energy bluetooth transmitter contained within the first media device, to a second media device, the steganographic metadata signal encoded with the identified supplementary content the first media device configured to dynamically change an emitted bluetooth signature of the low energy bluetooth transmitted based on the steganographic metadata encoded within the broadcast signal;
  wherein the second media device comprises one or more processors and a memory, the one or more processors configured to execute a set of program instructions stored in memory, the set of program instructions configured to cause the one or more processors to:
    receive, via a low energy bluetooth receiver, the steganographic metadata signal from the first media device; and
    generate a supplementary AV signal with an output unit of the second media device, the supplementary output signal based on the encoded supplementary content.

* * * * *